(12) United States Patent
McPeak et al.

(10) Patent No.: US 6,289,912 B1
(45) Date of Patent: Sep. 18, 2001

(54) PINCH ELEMENT PLASTIC VALVE

(75) Inventors: Thomas J. McPeak, Shakopee; James C. Linder, Shorewood; Jeffrey J. McKenzie, Watertown; Steven A. Melbostad, Shakopee; Michael W. Johnson, Minneapolis, all of MN (US)

(73) Assignee: Fluoroware, Inc., Chaska, MN (US)

( * ) Notice: Subject to any disclaimer, the term of this patent is extended or adjusted under 35 U.S.C. 154(b) by 0 days.

(21) Appl. No.: 09/349,317

(22) Filed: Jul. 8, 1999

Related U.S. Application Data
(60) Provisional application No. 60/092,248, filed on Jul. 10, 1998.

(51) Int. Cl.[7] .................................. F16L 9/14; F16K 7/04; B29C 65/18
(52) U.S. Cl. ........................... 137/15.18; 251/9; 138/142; 156/304.6
(58) Field of Search .................................. 138/142, 170, 138/171, 177, 99, DIG. 3; 156/73.5, 304.6; 251/7, 9; 137/15.18

(56) References Cited

U.S. PATENT DOCUMENTS

| | | | | |
|---|---|---|---|---|
| 2,665,738 | * | 1/1954 | Caskin | 156/304.6 X |
| 3,998,682 | * | 12/1976 | Harmsen | 156/304.6 |
| 4,484,975 | * | 11/1984 | McElroy | 156/304.6 |
| 4,876,041 | * | 10/1989 | Hanselka | 156/304.2 |
| 4,927,642 | * | 5/1990 | Kunz | 156/304.6 X |
| 4,929,293 | * | 5/1990 | Osgar | 156/304.6 |
| 5,297,773 | * | 3/1994 | Collins et al. | 251/9 X |
| 5,306,377 | * | 4/1994 | Jensen et al. | 156/304.6 |
| 5,328,541 | * | 7/1994 | Usui et al. | 156/304.6 X |
| 5,632,845 | * | 5/1997 | Stehle et al. | 156/304.6 X |
| 5,779,843 | * | 7/1998 | Kumagai et al. | 156/304.6 |
| 5,814,175 | * | 9/1998 | Rau et al. | 156/304.6 |
| 5,855,720 | * | 1/1999 | Johnson et al. | 156/304.6 |
| 5,879,503 | * | 3/1999 | McDunn et al. | 156/304.6 |

FOREIGN PATENT DOCUMENTS 05084841A   4/1993   (JP) ..................................... 156/187

* cited by examiner

*Primary Examiner*—Kevin Shaver
*Assistant Examiner*—Eric Keasel
(74) *Attorney, Agent, or Firm*—Patterson, Thuente, Skaar & Christensen, P.A.

(57) ABSTRACT

A valve has a contractible valve element formed of an inner laminae of PFA, an outer laminae of PTFE with the outer laminae having a boss to provide positive compression and positive distension of the valve element. The portion that constrict is welded to a PFA tubular end portion thus providing the advantages of a PTFE laminae with a boss and the PFA what it surfaces. The valve utilizes a valve mechanism which has a yoke which moves radially towards and away from the contractible valve element with linkages extending from yoke arms which connect to opposite sides of the contractible valve element. The valve element may thus be positively closed and positively opened. The hermetic seal between the outer PTFE laminae and the inner PFA laminae causes the inner laminae to extend outwardly when the outer laminae is positively distended thereby allowing the valve function where the fluid being controlled is under a negative pressure. The invention also includes the method of manufacturing the multiple layered valve element.

8 Claims, 5 Drawing Sheets

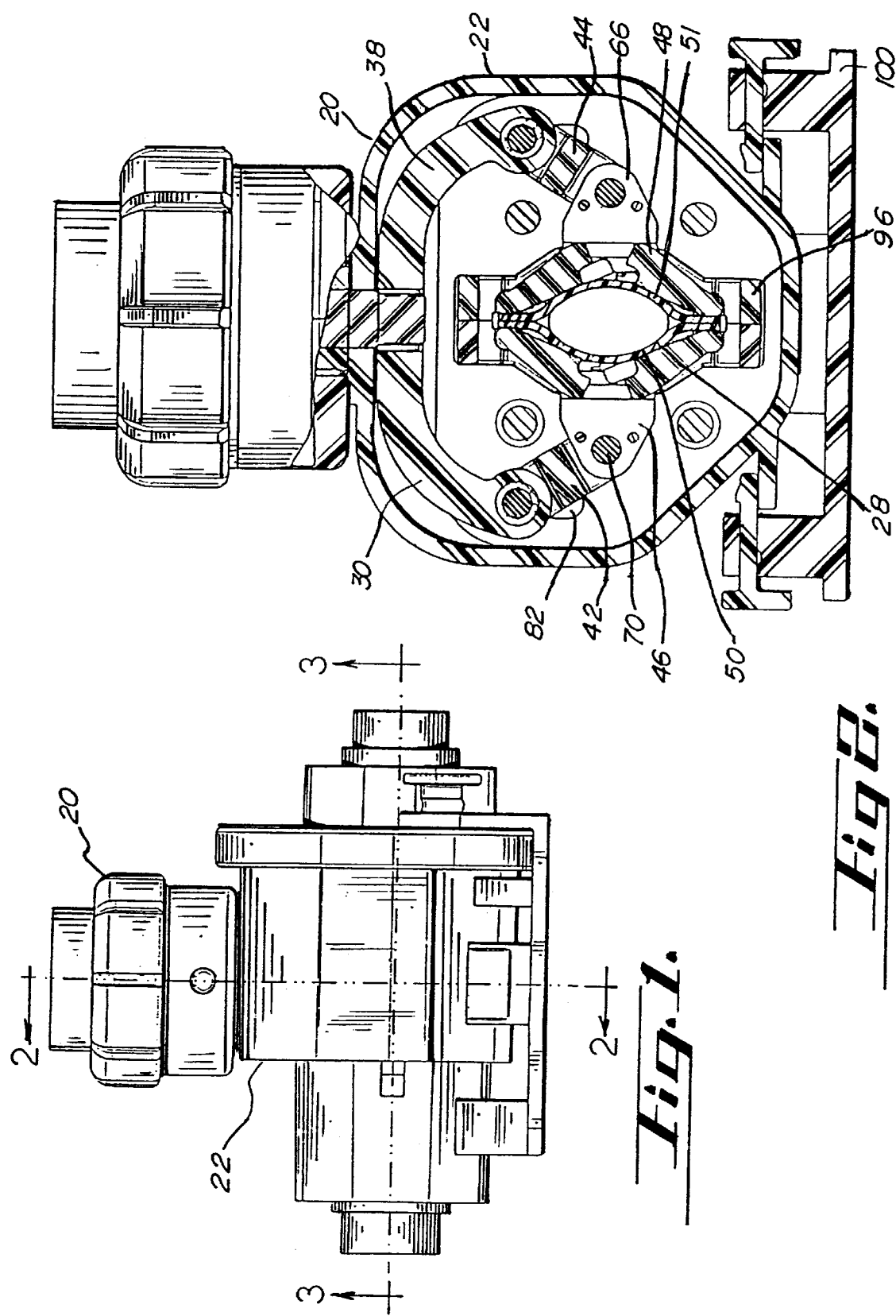

PINCH ELEMENT PLASTIC VALVE

This application claims benefit of Provisional Appln. 60/092,248 filed Jul. 10, 1998.

BACKGROUND OF THE INVENTION

This invention relates to valves, more particularly the invention relates to valves made primarily of plastic and which have contractible tubular valve elements.

Plastic valves are known which utilize collapsible plastic valve elements made of perfluoroalkoxy (PFA), see U.S. Pat. No. 5,297,773 to Timothy Collins et al. which is assigned to the owner of the instant invention and which is hereby incorporated by reference. The Collins valve utilizes multiple layers of PFA to form the collapsible valve element. Longitudinal edges of the sandwiched laminae are welded together and the ends of the collapsible portion of the valve element are welded to tubular end portions. The "normal" state of this collapsible valve element is in an open position and is closed by way of a camming member wedging against a clamping portion to pinch the collapsible portion of the valve element closed as desired. Although this valve is quite effective for fluid flows under pressurized conditions, if the fluid flow is in a negative or below atmospheric condition the collapsible portion of the valve member. Therefore, this valve does not have a positive distensible function. Valves such as shown in the Collins patent may be constructed exclusively of synthetic plastic materials.

U.S. Pat. No. 3,791,617 to Press discloses a valve with a contractible valve element formed of extruded PTFE tube. Bosses are machined on the extruded tube and are connected by way of metal connectors to the valve mechanism thereby providing a positive extensible function to the valve permitting it to operate with the fluid flow in a below atmospheric pressure condition. This valve element consists of a single lamina formed of PTFE. Moreover, a single tubular valve element of PTFE provides much more significant resistance to compressing and distending than the same thickness of multiple layers.

In the semiconductor processing industry, fluid flow conduits of PFA are the preferred material. A problem associated with PFA is that welding PFA components together is difficult. Contact welding can cause the PFA to stick to the weld elements and cause surface irregularities. Non-contact welding, such as illustrated in U.S. Pat. No. 4,929,293 to Osgar, which is owned by the assignee of this application, can leave an internal bead which is inimical to regulated fluid flow in a valve and is generally undesirable in many applications. Although PTFE is recognized as an inert substance, PTFE is difficult or impossible to mold into fittings and it is difficult or impossible to weld PTFE components to one another. Moreover, processors often prefer that all wetted surfaces in process system lines be made exclusively of PFA. PTFE is more readily machinable than PFA and has a higher flex life than PFA. U.S. Pat. Nos. 4,929,293 and 5,297,773 are hereby incorporated by reference.

Bosses on PFA contractible valve elements are difficult to manufacture and are prone to failure. Bosses formed on valve elements of PTFE, on the other hand, have been demonstrated to be quite reliable.

Therefore, it would be desirable to have a valve with a contractible valve element formed of multiple laminae that has wetted surfaces of PFA, that has a boss to provide positive distension of the valve element, that has fittings of PFA and that has a smooth beadless weld between the contractible valve element and the PFA valve fittings.

SUMMARY OF THE INVENTION

A valve has a contractible valve element formed of an inner lamina of PFA, an outer lamina of PTFE with the outer laminae having a boss to provide positive compression and positive distension of the valve element. The portion that constricts is welded to a PFA valve fitting with a tubular end portion thus providing the advantages of a PTFE laminae with a boss and exclusively PFA wetted surfaces. The valve utilizes a valve mechanism with a yoke which moves radially towards and away from the contractible valve element with linkages extending from yoke arms connecting to opposite sides of the contractible valve element. The hermetic seal between the outer PTFE lamina and the inner PFA lamina causes the inner lamina to extend outwardly when the outer lamina is positively distended thereby allowing the valve to function where the fluid being controlled is under a negative pressure. The invention also includes the method of manufacturing the multiple layered valve element which provides a smooth weld between the contractible portion of the valve element and the valve fittings.

BRIEF DESCRIPTION OF THE DRAWINGS

FIG. 1 is an elevation view of a valve incorporating the invention.

FIG. 2 is a cross-sectional view of the valve of FIG. 1 taken at line 2—2.

DETAILED SPECIFICATION

Figure 3:
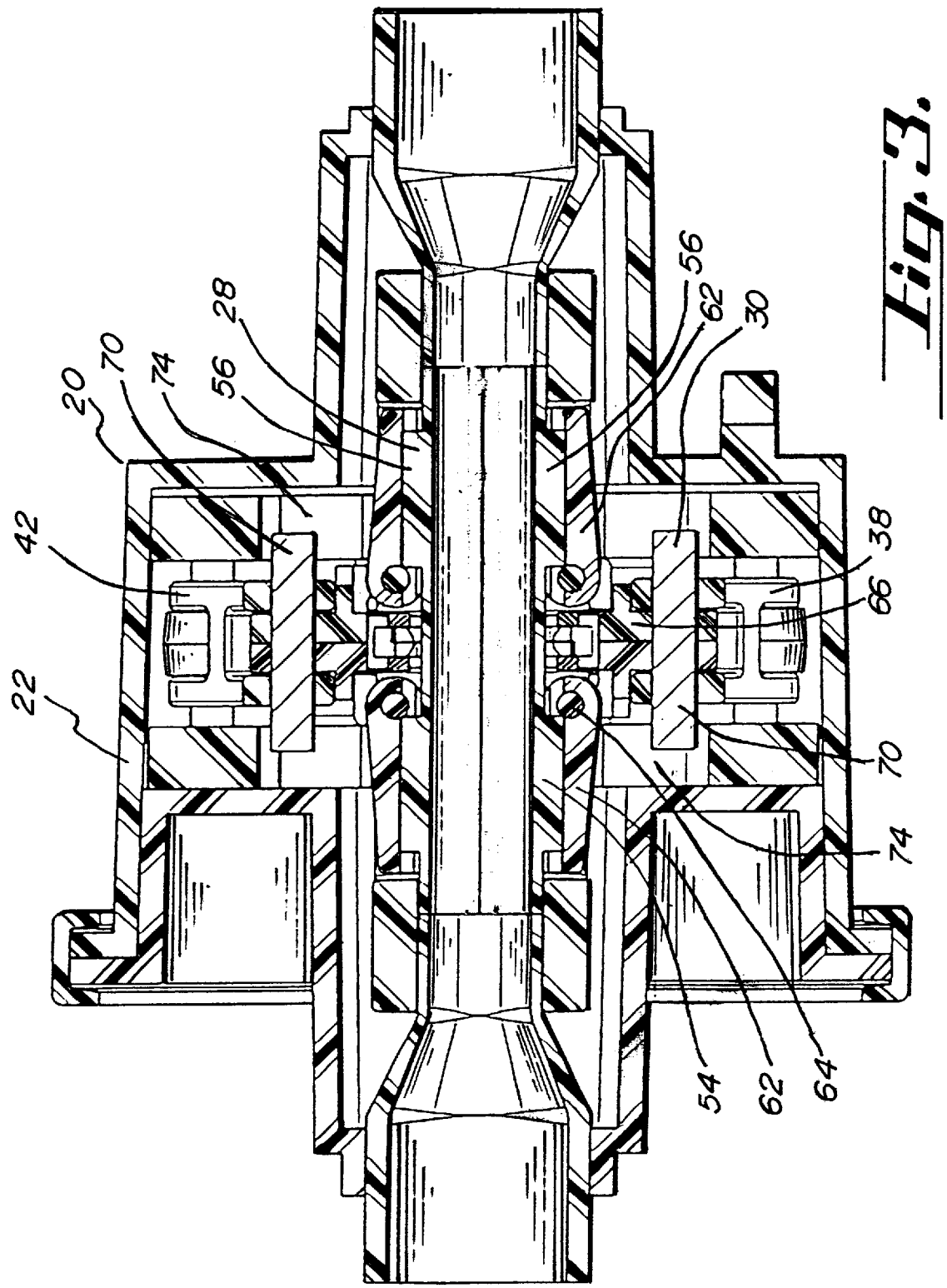
FIG. 3 is a cross-sectional view of the valve of FIG. 1 taken at line 3—3.
Figure 4:
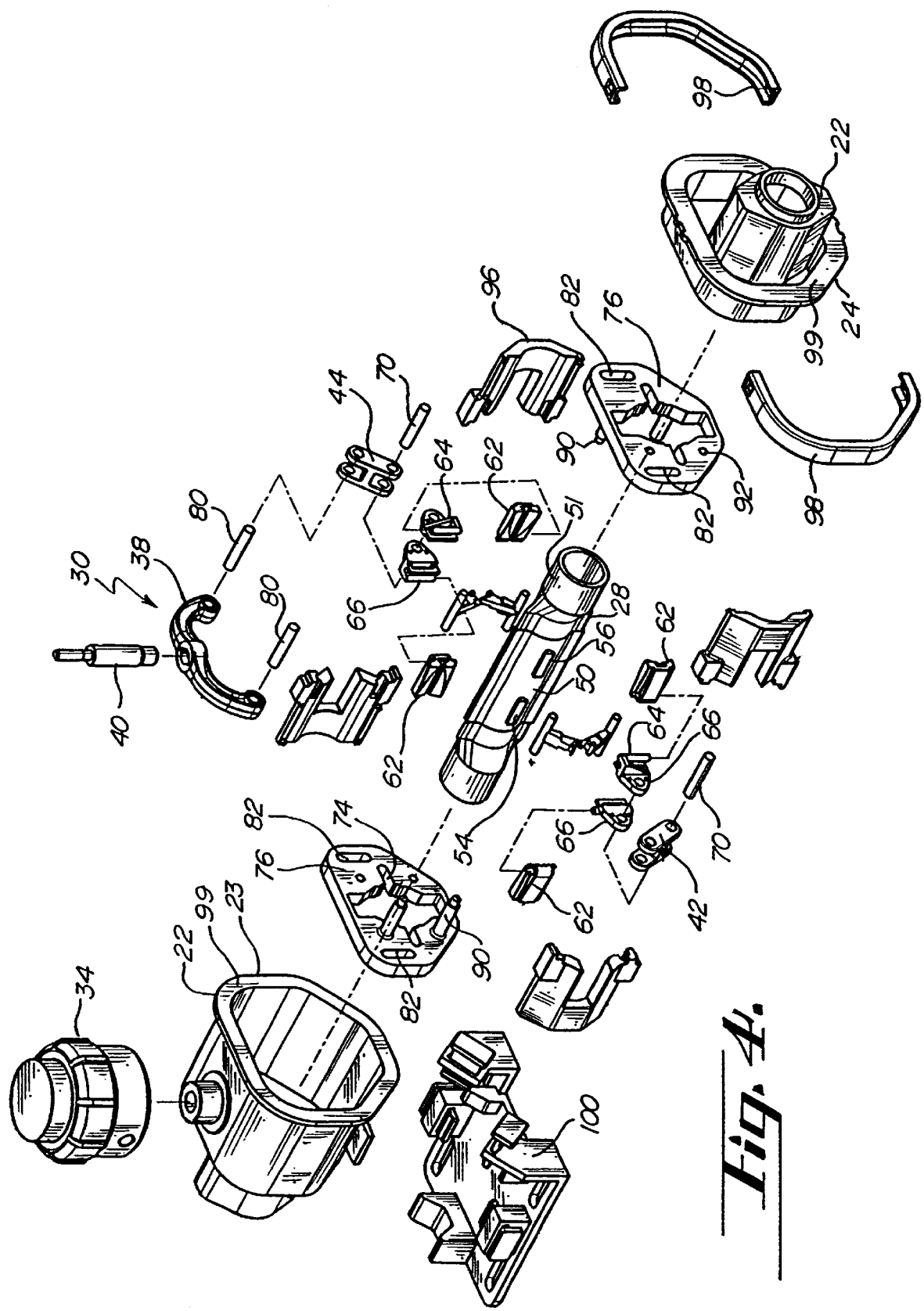
FIG. 4 is an exploded view of the valve of FIGS. 1–3.
Figure 5:
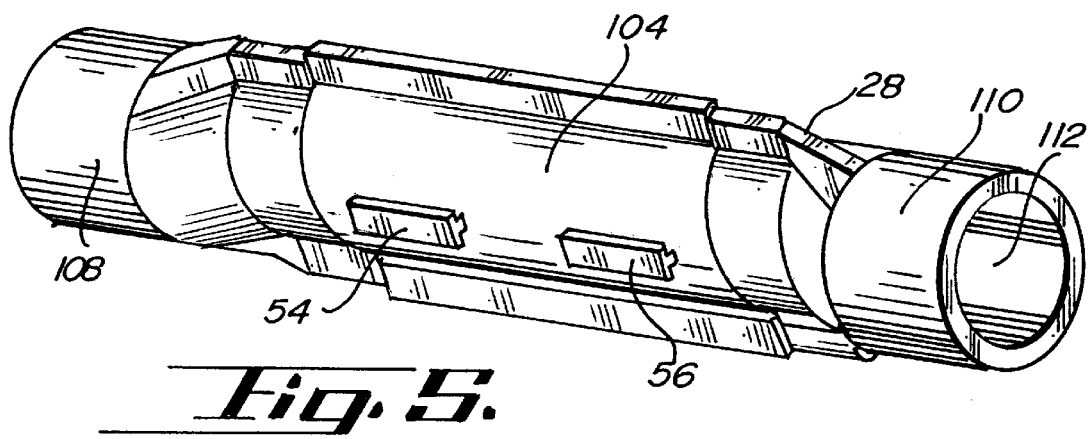
FIG. 5 is a perspective view of a valve element according to the invention.
Figure 6:
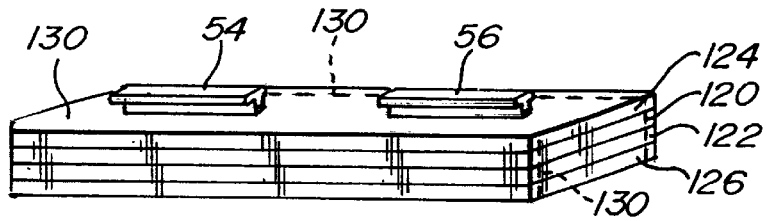
FIG. 6 is a perspective view of a four ply section of laminae suitable for manufacturing the valve element of FIG. 5.
Figure 7:
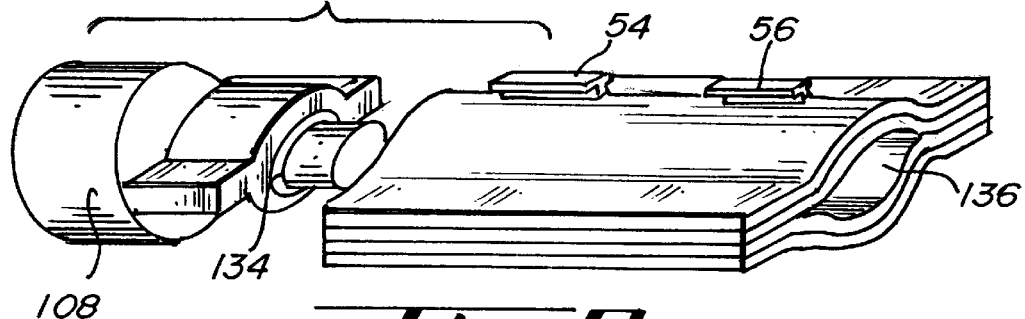
FIG. 7 is a perspective view illustrating a fitting in precedent to welding to the section of laminae of FIG. 6.
Figure 8:
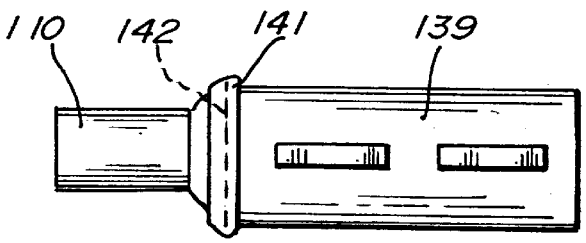
FIG. 8 is a plan view of the components of FIG. 7 with a film wrap around the juncture to be welded.
Figure 9:
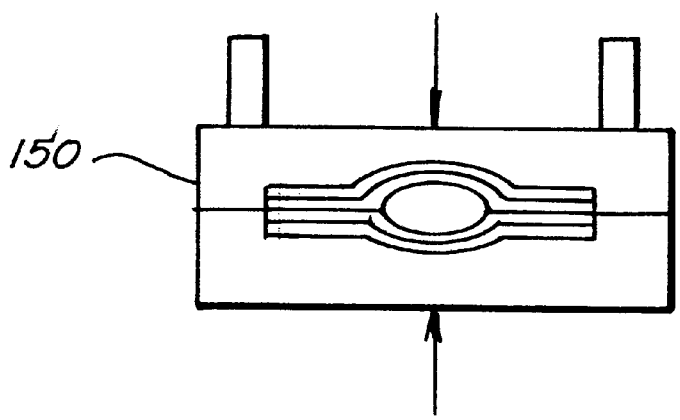
FIG. 9 is a plan view of a weld apparatus.

Referring to FIGS. 1, 2, 3, and 4, the valve of the instant invention is depicted and is indicated generally by the numeral 20. The valve is comprised principally of a valve body 22 with valve body sections 23, 24, a valve element 28 and a valve mechanism 30. The valve mechanism 30 is operated by an actuator 34 which may be pneumatically powered or otherwise operated by suitable power means including manual operation. The valve mechanisms is comprised of a yoke 38, a shaft 40 connecting to the yoke and extending into the actuator, linkages 42, 44 and clamping portions 46, 48.

When used herein "connect", "connectly" and "connected" mean the parts are mechanically coupled or linked and the terms do not require such parts to be in direct contact. The elements connected may be connected thru one or more additional elements.

The valve element which is described in more detail below generally has a first side 50 and a second side 51. The clamping portions 46, 48 are respectively engaged to the first and second sides of the valve element. The valve element has bosses 54, 56 to facilitate attachment of the clamping portions and thus the linkages to the valve element. The bosses are shaped as flanges with a T-shaped cross-section onto which slidably engaged are the slide portions 62 which further engage with pins 64 on brackets 66. The brackets 66 are secured to the linkages 42, 44 by way of pins 70. Notably the pins 70 extend into slots 74 in the wear plate 76. Said slots 74 extend in the radial direction in which the compression and distension of the valve element occurs. The linkages 42, 44 are connected to the yoke 38 by way of pins 80 which also engage with vertical slots 82 in the wear plates 76. Thus the pins engaged with said vertical slots 82 and horizontal slots 74 facilitate the translation of the vertical motion of the yoke 38 into a transverse or horizontal motion for compression of the valve element 28. The wear plates 76 are secured with respect to one another by way of post 90 and apertures 92. Support elements 96 operate to maintain the valve element properly positioned in the valve body and facilitate proper positioning and operation of the clamping portions 46, 48. The yoke and linkages may be suitably configured to provide an over center position whereby the valve mechanism can lock the valve element in the closed position.

The valve body sections 23, 24 may be secured together by way of the clips 98 which may be configured to simply snap onto the flanges 99 of said sections. The valve may include a valve base 100 to facilitate mounting or installation or said valve.

Referring to FIGS. 5, 6, 7, 8, and 9, details of the valve element and methods of construction are illustrated. The valve element 28 principally comprises a contractible or compressible portion 104, bosses 54, 56, tubular end portions and a fluid flow concourse or passage 112. The contractible portion 104 is fabricated from multiple layers of fluoropolymer material. In the preferred embodiment a first lamina 120 and a second lamina 122 are rectangular and comprised of PFA. A third lamina 124 and a fourth lamina 126 are formed of PTFE. The TFM-1700 formulation of PTFE available from Hoerchst is suitable. Said third and fourth laminae are the outer laminae and include the bosses 54, 56 which may be welded together under pressure and by way of conduction heat to form a weld such as illustrated by the dashed lines labelled with the numeral 130. It has been found that the four ply section is suitably welded on the edge portions when said edge is clamped between weld apparatus portions heated to 670° F. for a period of two and a half minutes. The contractible portion 104 is welded onto a tubular end portion 108 as follows. A mandrel with an oval cross section is inserted into the open end 134 of the tubular end portion 108 as well as into the opening 136 of the sandwiched four ply welded portion. A layer of polyamide film such as the Kapton® brand, available from DuPont Electronics, is wrapped around the juncture 142 between the fitting 110 and the four ply section 139. The ends of the layer of film may be sealed together with cyanoacrylic adhesive. The combined elements are inserted into a conduction heating weld apparatus 150, radial pressure is provided to the weld apparatus portions, and sufficient heat is provided to the juncture through the film 141 so as to weld the fitting to the four ply section. The welded piece is then removed from the heater 150, allowed to cool, and the sacrificial film 141 is removed and discarded. Such a welding procedure prevents the difficultly of the PFA adhering to the weld apparatus and provides for a very smooth and uniform weld, and eliminates flashing formed where the weld apparatus portions join during the weld process.

The mandrel, which may be formed of separate portion of polyamide, PTFE, salt or other suitable material is removed. The process is repeated for the other fitting. The tubular end portions of the valve may be similarly welded to other tubular end portions, such as on a section of tubing. Significantly, this method is suitable for generally welding tubular end portions of PFA fittings, tubing, and pipe.

Figure 10:
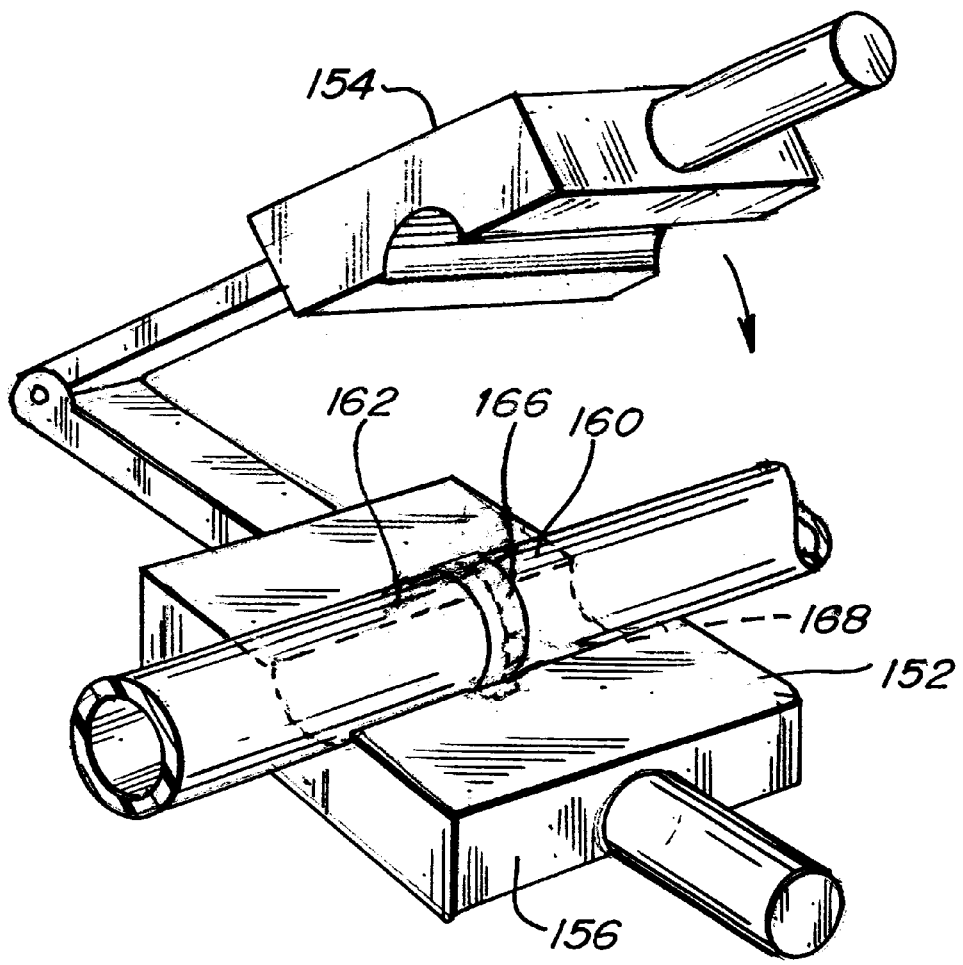
FIG. 10 is a perspective view of a portable weld apparatus suitable for welding tubular end portions.

Referring to FIG. 10, a portable weld apparatus 152 is shown and comprises weld apparatus portions 154, 156 hinged together which clamp around a pair of PFA tubing end portions 160, 162 to be welded. A wrap 166 of heat resistant film extends around the juncture 168 to be welded. The heat provided by the weld apparatus may be appropriately restricted such that the portions of the tubular end portions which exceed the melt temperature of the plastic components is restricted to the portions covered by the wrap. It has been found that portions to be joined may be placed in weld apparatus portions which have been preheated to 640° F. at the weld site. The temperature is elevated to 650° F. and then allowed to cool to 400° F. at which point the part may be removed. It has been found that 100 lbs. of radial force is suitable in the weld apparatus of FIG. 9. Appropriate welding parameters can be readily determined by appropriate testing and such will obviously vary depending on the particular characteristics of the components to be welded and the weld apparatus. The film utilized should be flexible, resistant to heat under the conditions discussed above and strong enough to be removed from the weld site after the weld operation.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. The method of fabricating a valve element for a contractible tube valve with the contractible portion having a pair of opposing fluoropolymer collapsible sides defining a fluid flow conduit and two open ends, a pair of fluoropolymer tubular end portions, each tubular end portion sized to conform to one another, the method comprising the steps of:

a) positioning a mandrel within the pair of tubular end portions to be welded;

b) abutting the tubular end portions to to define a juncture to be welded;

c) covering the juncture to be welded by wrapping around the juncture a layer of flexible impervious film, said impervious film having a melting temperature greater than that of the pair of fluoropolymer tubular end portions and greater than that of the fluoropolymer collapsible sides;

d) heating the juncture to be welded in a conduction heater sufficient to fuse the tubular end portion to the contractible portion; and e) removing the impervious film from the juncture.

2. The method of claim 1 further comprising the step of selecting a polyamide film as the layer of flexible impervious sheet.

3. A method of joining a pair of fluoropolymer tubular end portions comprising the steps of:

a) abutting the pair of tubular end portions to define a juncture to be welded;

b) covering the juncture to be welded by wrapping around the juncture a layer of flexible impervious sheet, said impervious sheet having a melting temperature greater than that of the fluoropolymer tubular end portions;

c) positioning the pair of tubular end portions in a conduction weld apparatus with weld portions;

d) clamping weld portions of the conduction weld apparatus around the tubular end portions;

e) heating the juncture to be welded with the conduction weld apparatus sufficient to fuse the tubular end portions at the juncture; and f) removing the impervious sheet from the juncture.

4. The method of claim 3 further comprising the step of selecting a polyamide film as the layer of flexible impervious sheet.

5. The method of claim 3 further comprising the step of providing radial pressure to the juncture to be welded.

6. The method of claim 5 further comprising the step of selecting PFA tubular end portions.

7. A method of joining a pair of PFA tubular end portions comprising the steps of:

a) abutting the pair of PFA tubular end portions to define a juncture to be welded;

c) covering the juncture to be welded by wrapping around the junction a layer of polyamide film;

d) positioning the pair of PFA tubular end portions in a conduction weld apparatus;

e) providing radial pressure to the tubular end portions with the weld apparatus;

f) heating the juncture to be welded by the conduction weld apparatus sufficient to fuse the tubular end portions at the juncture; and g) removing the impervious sheet from the juncture.

8. The method of claim 7 further comprising the step of insertion of a mandrel into the PFA tubular end portions.

* * * * *